United States Patent
Yoo

(10) Patent No.: US 10,599,784 B2
(45) Date of Patent: Mar. 24, 2020

(54) AUTOMATED INTERPRETATION METHOD AND APPARATUS, AND MACHINE TRANSLATION METHOD

(71) Applicant: Samsung Electronics Co., Ltd., Suwon-si (KR)

(72) Inventor: Sang Hyun Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/634,806

(22) Filed: Jun. 27, 2017

(65) Prior Publication Data
US 2018/0165276 A1  Jun. 14, 2018

(30) Foreign Application Priority Data

Dec. 9, 2016  (KR) .......................... 10-2016-0167426

(51) Int. Cl.
| | |
|---|---|
| G06F 17/28 | (2006.01) |
| G10L 15/22 | (2006.01) |
| G10L 15/02 | (2006.01) |
| G10L 15/26 | (2006.01) |

(52) U.S. Cl.
CPC ............ G06F 17/289 (2013.01); G06F 17/28 (2013.01); G06F 17/2854 (2013.01); G10L 15/02 (2013.01); G10L 15/22 (2013.01); G10L 15/26 (2013.01)

(58) Field of Classification Search
CPC ..... G06F 17/289; G06F 17/2854; G06F 17/28
See application file for complete search history.

(56) References Cited

U.S. PATENT DOCUMENTS

| | | | |
|---|---|---|---|
| 10,185,713 B1 * | 1/2019 | Denkowski | G06F 17/2818 |
| 2006/0080079 A1 * | 4/2006 | Yamabana | G06F 17/289 |
| | | | 704/2 |
| 2006/0206304 A1 * | 9/2006 | Liu | G06F 17/2836 |
| | | | 704/2 |
| 2006/0293893 A1 | 12/2006 | Horvitz | |
| 2008/0215309 A1 * | 9/2008 | Weischedel | G06F 17/2229 |
| | | | 704/3 |
| 2010/0131260 A1 * | 5/2010 | Bangalore | G06F 17/279 |
| | | | 704/3 |

(Continued)

FOREIGN PATENT DOCUMENTS

| | | |
|---|---|---|
| KR | 10-2011-0065916 A | 6/2011 |
| KR | 10-2015-0085145 A | 7/2015 |
| KR | 10-2016-0080711 A | 7/2016 |

Primary Examiner — Bryan S Blankenagel
(74) Attorney, Agent, or Firm — NSIP Law

(57) ABSTRACT

An automated interpretation method includes: interpreting a source voice signal expressed in a first language by dividing the source voice signal into at least one word as a unit while the source voice signal is being input, and outputting, as an interpretation result in real time, a first target voice signal expressed in a second language by each unit; determining whether to re-output the interpretation result; and in response to a determination of the determining of whether to re-output the interpretation being a determination that the interpretation result is to be re-output, interpreting the source voice signal by a sentence as a unit and outputting, as the interpretation result, a second target voice signal expressed in the second language.

36 Claims, 11 Drawing Sheets

(56) References Cited

U.S. PATENT DOCUMENTS

| | | | |
|---|---|---|---|
| 2012/0284015 A1* | 11/2012 | Drewes | G06F 17/2818 704/3 |
| 2013/0103384 A1* | 4/2013 | Hunter | G06F 17/28 704/3 |
| 2014/0100843 A1* | 4/2014 | Tanaka | G06F 17/2854 704/2 |
| 2014/0358524 A1* | 12/2014 | Papula | G06F 17/2854 704/9 |
| 2015/0134320 A1* | 5/2015 | Rangarajan Sridhar | G06F 17/2775 704/2 |
| 2015/0134322 A1 | 5/2015 | Cuthbert et al. | |
| 2015/0199340 A1* | 7/2015 | Kwon | G06F 17/289 704/2 |
| 2015/0347399 A1* | 12/2015 | Aue | G06F 17/289 704/2 |
| 2016/0147744 A1* | 5/2016 | Wang | G06F 17/2854 704/277 |
| 2016/0170970 A1* | 6/2016 | Lindblom | G06F 17/28 704/3 |

\* cited by examiner

310 — "Subway Station near City Hall" + "How do I go?"
　　　　　　　　　311　　　　　　　　　　　312

320 — How do I go to the Subway Station near City Hall?

AUTOMATED INTERPRETATION METHOD AND APPARATUS, AND MACHINE TRANSLATION METHOD

CROSS-REFERENCE TO RELATED APPLICATIONS

This application claims the benefit under 35 USC § 119(a) of Korean Patent Application No. 10-2016-0167426 filed on Dec. 9, 2016, in the Korean Intellectual Property Office, the entire disclosure of which is incorporated herein by reference for all purposes.

BACKGROUND

1. Field

The following description relates to an automated interpretation method and apparatus, and a machine translation method.

2. Description of Related Art

Amid expanding international exchanges, a greater amount of information and resources are being exchanged globally in the process of globalization. Globalization of businesses and popularization of overseas trips, in particular, have accelerated developments in interpretation and translation technologies for communication among users using various languages.

Realtime interpretation or translation may rapidly output an interpretation or translation result. However, such a rapidly output result may be of a relatively low quality. Compared to such realtime interpretation or translation, non-realtime interpretation or translation may take a greater amount of time to output an interpretation or translation result. However, the interpretation or translation result from the non-realtime interpretation or translation may be of a higher quality than an interpretation or translation result from the realtime interpretation or translation.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, an automated interpretation method includes: interpreting a source voice signal expressed in a first language by dividing the source voice signal into at least one word as a unit while the source voice signal is being input, and outputting, as an interpretation result in real time, a first target voice signal expressed in a second language by each unit; determining whether to re-output the interpretation result; and in response to a determination of the determining of whether to re-output the interpretation being a determination that the interpretation result is to be re-output, interpreting the source voice signal by a sentence as a unit and outputting, as the interpretation result, a second target voice signal expressed in the second language.

The determining of whether to re-output the interpretation may include determining whether to re-output the interpretation result based on a difference between a first target sentence corresponding to the first target voice signal and a second target sentence corresponding to the second target voice signal.

The determining of whether to re-output the interpretation result may further include determining that the interpretation result is to be re-output, in response to the first target sentence not having a same meaning as the second target sentence.

The determining of whether to re-output the interpretation result may further include determining that the interpretation result is to be re-output, in response to a degradation of an interpretation quality of the first target sentence determined based on the second target sentence being greater than or equal to a reference value.

The determining of whether to re-output the interpretation result may include determining that the interpretation result is to be re-output, in response to a first target sentence corresponding to the first target voice signal not being suited to a grammar rule of the second language.

The determining of whether to re-output the interpretation result may further include determining that the interpretation result is to be re-output, in response to the first target sentence not being suited to a word order of the second language.

The determining of whether to re-output the interpretation result may include determining whether to re-output the interpretation result based on feedback on the first target voice signal from a user.

The determining of whether to re-output the interpretation result may further include determining whether to re-output the interpretation result based on a voice signal input from a user listening to the first target voice signal.

The determining of whether to re-output the interpretation result may include determining whether to re-output the interpretation result based on whether a command for requesting the re-outputting of the interpretation result is input, subsequent to the first target voice signal being output, by a user that has expressed the source voice signal.

The at least one word may be determined based on one of a silence included in the source voice signal and a sentence element included in the source voice signal.

The outputting of the second target voice signal may include outputting the second target voice signal subsequent to outputting a message indicating that the interpretation result is to be re-output.

The outputting of the second target voice signal may include outputting the second target voice signal expressed in the second language as the interpretation result by interpreting the source voice signal by a sentence as a unit subsequent to determining that the interpretation result is to be re-output.

A non-transitory computer-readable storage medium may store instructions that, when executed by a processor, cause the processor to perform the method.

In another general aspect, a machine translation method includes: translating a source sentence expressed in a first language by dividing the source sentence into at least one word as a unit while the source sentence is being input, and outputting, as a translation result in real time, a first target sentence expressed in a second language by each unit; determining whether to re-output the translation result; and in response to a determination of the determining of whether to re-output the translation result being a determination that the translation result is to be re-output, translating the source sentence by each sentence as a unit and outputting, as a translation result, a second target sentence expressed in the second language.

In another general aspect, an automated interpretation apparatus includes: a memory storing at least one instruction; and a processor configured to, by executing the at least one instruction, interpret a source voice signal expressed in a first language by dividing the source voice signal into at least one word as a unit while the source voice signal is being input, and output, as an interpretation result in real time, a first target voice signal expressed in a second language by each unit, determine whether to re-output the interpretation result, and in response to a determination of the determining of whether to re-output the translation result being a determination that the interpretation result is to be re-output, interpret the source voice signal by each sentence as a unit and output a second target voice signal expressed in the second language as the interpretation result.

The processor may be configured to determine whether to re-output the interpretation result based on a difference between a first target sentence corresponding to the first target voice signal and a second target sentence corresponding to the second target voice signal.

The processor may be configured to determine that the interpretation result is to be re-output, in response to the first target sentence not having a same meaning as the second target sentence.

The processor may be configured to determine that the interpretation result is to be re-output, in response to a degradation of an interpretation quality of the first target sentence determined based on the second target sentence being greater than or equal to a preset reference value.

The processor may be configured to determine that the interpretation result is to be re-output, in response to a first target sentence corresponding to the first target voice signal not being suited to a grammar rule of the second language.

The processor may be configured to determine whether to re-output the interpretation result based on feedback on the first target voice signal from a user.

In another general aspect, an automated interpretation method includes: interpreting a source voice signal expressed in a first language, by interpreting sentence elements in the source voice signal as the sentence elements are spoken; outputting, as a first interpretation result, a first target voice signal expressed in a second language, based on the interpreting of the sentence elements in the source voice signal as the sentence elements are spoken; determining to output a second interpretation result based on any one of a difference between a first target sentence corresponding to the first target voice signal and a second target sentence corresponding to a second target voice signal, and feedback from a user; and in response to the determining to output the second interpretation result, interpreting the source voice signal by analyzing a complete sentence of the source voice signal as a unit, and outputting, as the second interpretation result, the second target voice signal expressed in the second language, based on the interpreting of the source voice signal by analyzing the complete sentence of the source voice signal as the unit.

The automated interpretation method may further include outputting an indication that the second interpretation result is to be output, prior to the outputting of the second target voice signal.

Each of the sentence elements may include any one of a subject, a predicate corresponding to a verb, an object, a complement, and a modifier corresponding to an adverb.

The automated interpretation method may further include: storing the sentence elements in a memory, wherein the analyzing of the complete sentence of the source voice signal as the unit includes obtaining the sentence elements from the memory.

Other features and aspects will be apparent from the following detailed description, the drawings, and the claims.

Figure 1:
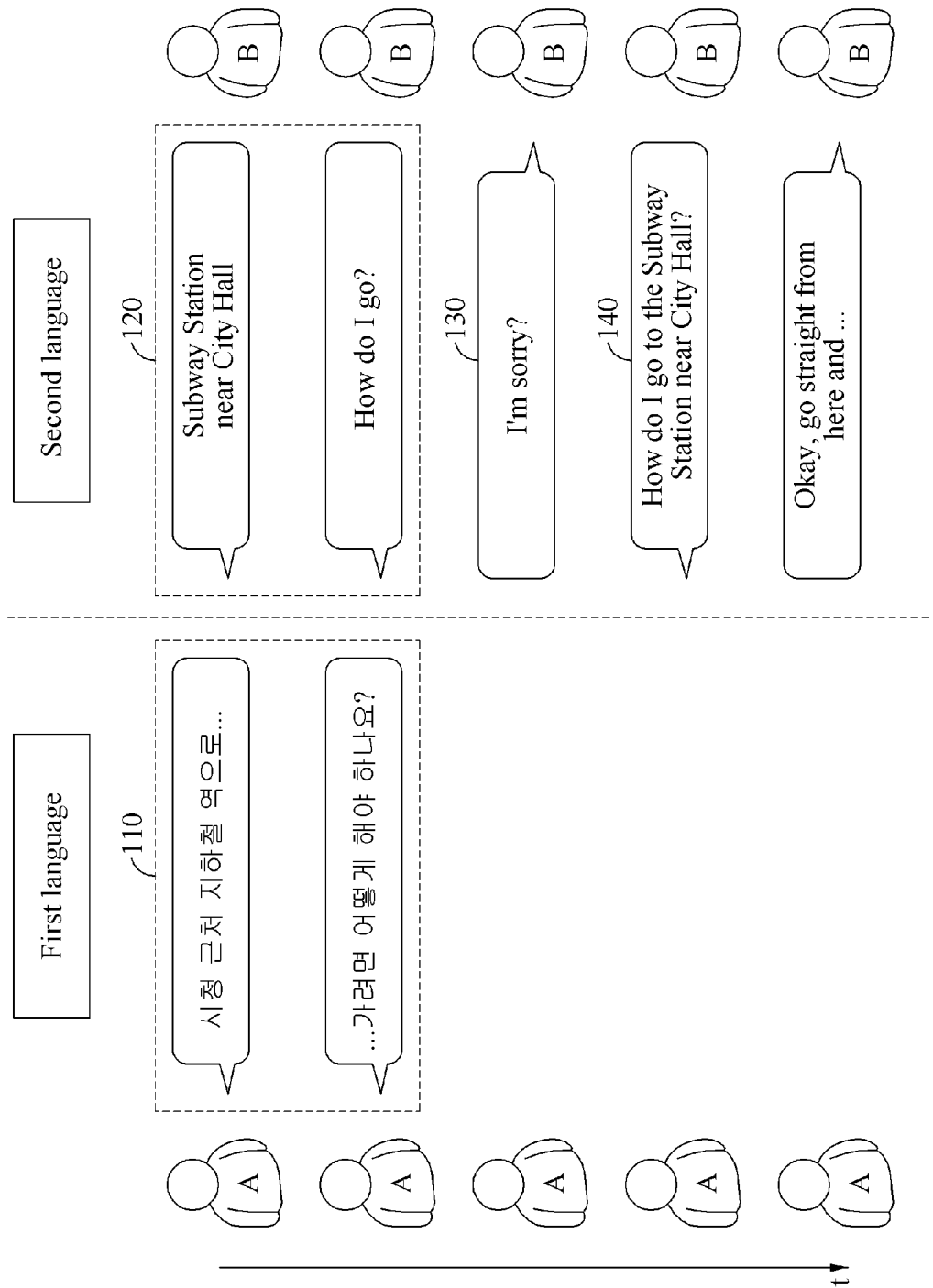
FIG. 1 is a diagram illustrating an example of an operation principle of an automated interpretation apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The following example embodiments may be applicable to help provide interpretation or translation. Example embodiments may be embodied as various types of products such as a personal computer (PC), a laptop computer, a tablet computer, a smartphone, smart home appliances, a wearable device, a smart vehicle, a kiosk, and the like. In examples, embodiments may include non-transitory computer readable media including interpretation or translation application(s), instructions, or software to be executed in/by one or more processors of such a smartphone, mobile device, smart home system, wearable device, and the like embodiments. Example embodiments include providing interpretation services in a private vehicle, a bus, a taxi, corresponding public transports, people movers, and the like for communication between a driver and a passenger of any such vehicle on board who use different languages, or providing translation services for translation of sentences expressed in different languages. Hereinafter, such non-limiting example embodiments will be described in greater detail with reference to the accompanying drawings.

FIG. 1 is a diagram illustrating an example of an operation principle of an automated interpretation apparatus. Referring to FIG. 1, an automated interpretation apparatus performs automated interpretation on characters and/or words of a first language spoken by a user A to convert the characters and/or words into a second language.

In one example, the automated interpretation apparatus is an apparatus configured to interpret a source voice signal expressed in a first language into a target voice signal expressed in a second language and including, for example, a voice recognizer, a machine translator, and a voice synthesizer. The voice recognizer converts a voice signal obtained from a user to a sentence expressed in the first language. The machine translator converts the sentence in the first language to a sentence expressed in the second language. The voice synthesizer converts the sentence in the second language to a voice signal expressed in the second language using a text-to-speech (TTS) method. Thus, the automated interpretation apparatus performs the interpretation by converting the source voice signal expressed in the first language to the target voice signal expressed in the second language using the voice recognizer, the machine translator, and the voice synthesizer.

In another example, the automated interpretation apparatus is an apparatus configured to output a source voice signal expressed in a first language to be a target sentence expressed in a second language and includes, for example, the voice recognizer and the machine translator. The automated interpretation apparatus outputs a result obtained through a conversion to the second language, and thus does not perform the operation of the voice synthesizer described in the foregoing.

In another example, the automated interpretation apparatus is an apparatus configured to output a source sentence expressed in a first language to be a target sentence expressed in a second language and includes, for example, the machine translator. The automated interpretation apparatus receives the source sentence in the first language from a user and outputs the target sentence in the second language. Thus, the automated interpretation apparatus does not perform the operations of the voice recognizer and the voice synthesizer described in the foregoing examples.

For convenience of description, the automated interpretation apparatus including the voice recognizer, the machine translator, and the voice synthesizer will be described hereinafter.

The first language and the second language described herein indicate different languages. The first and second languages may be languages having different word orders including, for example, Korean and English. Alternatively, the first and second languages may be languages having a same word order including, for example, Korean and Japanese.

The automated interpretation apparatus may perform non-realtime interpretation of the source voice signal input from the user A. In an example of non-realtime interpretation of the source voice signal, the automated interpretation apparatus receives the source voice signal from the user A until the source voice signal is input as a complete sentence, and interprets the source voice signal including the complete sentence. Because the non-realtime interpretation is performed on the source voice signal including the complete sentence, a quality of the interpretation may be relatively high. However, since the interpretation is performed after the source voice signal is input as the complete sentence, a relatively large amount of time may be consumed to output a result of the interpretation.

In addition, the automated interpretation apparatus may perform realtime interpretation of the source voice signal input from the user A. In an example of realtime interpretation of the source voice signal, the automated interpretation apparatus interprets a portion of the input source voice signal before the source voice signal is input as a complete sentence. In such an example, a result of the interpretation may be output before the source voice signal is input as the complete sentence, and thus the interpretation may be performed at a relatively high speed. However, because the interpretation is not performed based on an entire sentence, a quality of the interpretation may not be high, particularly when interpreting languages of which respective word orders are different from each other.

The automated interpretation apparatus may appropriately output a non-realtime interpretation result and a realtime interpretation result, and thus improve an interpretation speed while maintaining a high interpretation quality. In an example, the automated interpretation apparatus first outputs a realtime interpretation result. Additionally, in response to a quality of the realtime interpretation result failing to satisfy a predetermined standard, the automated interpretation apparatus may output a non-realtime interpretation result having a high interpretation quality and replace the realtime interpretation result with the non-realtime interpretation result.

In the example illustrated in FIG. 1, the automated interpretation apparatus provides a realtime interpretation result, and then selectively provides a non-realtime interpretation result.

The example illustrated in FIG. 1 assumes a situation in which the automated interpretation apparatus interprets " 시청 근처 지하철 역으로 가려면 어떻게 해야 하나요 ?" spoken in Korean by the user A into English. Referring to the example illustrated in FIG. 1, the automated interpretation apparatus receives " 시청 근처 지하철 역으로 가려면 어떻게 해야 하나요 ?" as a source voice signal 110 from the user A. The automated interpretation apparatus divides the source voice signal 110 into at least one word as a unit, and performs realtime interpretation based on the at least one word. For example, in response to a first partial voice signal "시청 근처 지하철 역으로" of the source voice signal 110 being input from the user A, the automated interpretation apparatus first interprets the first partial voice signal and outputs an interpretation result "Subway Station near City Hall," which is in English. Subsequently, in response to a second partial voice signal "가려면 어떻게 해야 하나요 ?" of the source voice signal 110 being input from the user A, the automated interpretation apparatus interprets the second partial voice signal and outputs an interpretation result "How do I go?" Thus, a first target voice signal 120 "Subway Station near City Hall How do I go?" is output as a realtime interpretation result.

A word order of the first language, which is Korean, and a word order of the second language, which is English, are different from each other, as illustrated in FIG. 1. Therefore, a quality of the realtime interpretation may not satisfy a predetermined standard. In such a case, a user B may not understand what the user A speaks based solely on the first target voice signal 120, and thus the user B may provide negative feedback 130, for example, a voice signal "I am sorry?," to request the user A to speak again.

Still referring to FIG. 1, in response to the negative feedback 130 being detected from the user B, the automated interpretation apparatus performs non-realtime interpretation on the source voice signal 110. The automated interpretation apparatus interprets the source voice signal 110 by each sentence as a unit, and outputs a second target voice signal 140. That is, the automated interpretation apparatus performs the interpretation based on the source voice signal 110 "시청 근처 지하철 역으로 가려면 어떻게 해야 하나요 ?" and outputs the second target voice signal 140 "How do I go to the Subway Station near City Hall?" as an interpretation result.

The user B, upon receiving the non-realtime interpretation result from the automated interpretation apparatus, may then accurately understand what the user B speaks, and continue a corresponding conversation with the user A.

A process of interpreting Korean into English described with reference to FIG. 1 is provided as an illustrative example only, and the same process may be applicable to various interpretations of various languages, for example, interpreting English into Korean and interpreting Korean into Japanese.

Figure 2A:
FIGS. 2A and 2B are diagrams illustrating examples of a method of interpreting a source voice signal by dividing the source voice signal into at least one word as a unit.
Figure 2B:
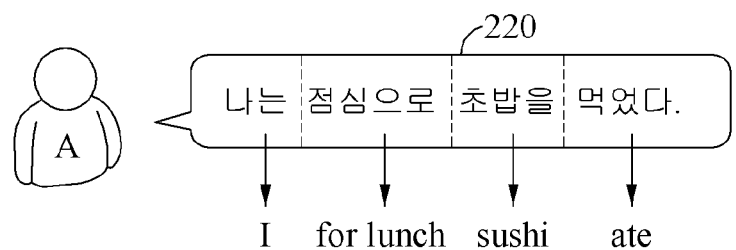

FIGS. 2A and 2B are diagrams illustrating examples of a method of interpreting a source voice signal by dividing the source voice signal into at least one word. Referring to FIGS. 2A and 2B, an automated interpretation apparatus performs realtime interpretation by dividing a source voice signal into at least one word.

In an example, the automated interpretation apparatus performs realtime interpretation by dividing a source voice signal into at least one word as a unit. The at least one word described herein refers to a unit on which the realtime interpretation is performed, and the automated interpretation apparatus may determine the at least one word based on a silence included in the source voice signal.

The example illustrated in FIG. 2A assumes a situation in which a user A speaks a source voice signal 210 " 시청 근처 지하철 역으로 가려면 어떻게 해야 하나요 ?". The user A may catch a breath, or otherwise stop speaking, for an amount of time after speaking a portion of the source voice signal 210, for example, " 시청 근처 지하철 역으로 가려면 " In such a case, the source voice signal 210 includes a silence having a time length greater than or equal to a reference time length. The automated interpretation apparatus detects the silence included in the source voice signal 210, and determines a first partial source voice signal " 시청 근처 지하철 역으로 가려면 " to be the at least one word from the source voice signal 210. The automated interpretation apparatus interprets the first partial source voice signal " 시청 근처 지하철 역으로 가려면 " and outputs a first partial target voice signal "Subway Station near City Hall."

Subsequently, when the user A speaks "'어떻게 해야 하나요 ?" without a silence having the time length greater than or equal to the reference time length, the automated interpretation apparatus determines a second partial source voice signal " '어떻게 해야 하나요 ?" to be the at least one word from the source voice signal 210. The automated interpretation apparatus interprets the second partial source voice signal " '어떻게 해야 하나요 ?" and outputs a second partial target voice signal "How do I go?"

In addition, the automated interpretation apparatus determines the at least one word based on a sentence element included in the source voice signal 210. The sentence element may include a subject, a predicate corresponding to a verb, an object, a complement, or a modifier corresponding to an adverb.

The example illustrated in FIG. 2B assumes a situation in which the user A speaks a source voice signal 220 "I ate sushi for lunch." The automated interpretation apparatus detects a subject as a first sentence element from the source voice signal 220 to be input, and determines a first partial source voice signal corresponding to the detected subject " 나는 " to be the at least one word. The automated interpretation apparatus interprets the first partial source voice signal " 나는 " and outputs a first partial target voice signal "I."

The automated interpretation apparatus detects a modifier as a second sentence element from the source voice signal 220 to be input subsequently to the first partial source voice signal " 나는 " and determines a second partial source voice signal corresponding to the detected modifier " 점심으로 " to be the at least one word. The automated interpretation apparatus interprets the second partial source voice signal " 점심으로 " and outputs a second partial target voice signal "for lunch."

The automated interpretation apparatus outputs a third partial target voice signal "sushi" by determining, to be the at least one word, a third partial source voice signal corresponding to an object "초밥을" detected from the source voice signal 220 to be input subsequently to the second partial source voice signal "점심으로" and interpreting the third partial source voice signal "초밥을" Similarly, the automated interpretation apparatus outputs a fourth partial target voice signal "ate" by determining, to be the at least one word, a fourth partial source voice signal corresponding to a predicate "먹었다" detected from the source voice signal 220 to be input subsequently to the third partial source voice signal "초밥을" and interpreting the fourth partial source voice signal "먹었다."

That is, when the first partial source voice signal is determined to be the at least one word from the source voice signal 210 or 220 while the source voice signal 210 or 220 is being input, the automated interpretation apparatus interprets the first partial source voice signal before the second partial source voice signal is determined from the source voice signal 210 or 220 to be input, and outputs the first partial target voice signal in real time. In addition, when the second partial source voice signal is determined to be the at least one word from the source voice signal 210 or 220 while the source voice signal 210 or 220 is being input, the automated interpretation apparatus interprets the second partial source voice signal irrespective of whether an additional partial source voice signal is determined from the source voice signal 210 or 220 to be subsequently input, and outputs the second partial target voice signal in real time. The method described in the foregoing is repetitively performed until realtime interpretation of the source voice signal 210 or 220 to be input is completed.

Figure 3:
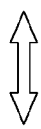
FIGS. 3 and 4 are diagrams illustrating an example of a method of determining whether to re-output an interpretation result.
Figure 4:
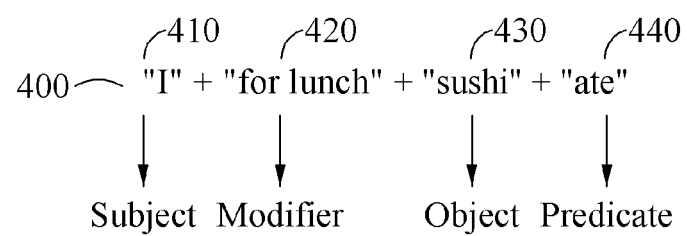

FIGS. 3 and 4 are diagrams illustrating an example of a method of determining whether to re-output an interpretation result.

Referring to FIG. 3, an automated interpretation apparatus determines whether to re-output an interpretation result (e.g., to output a new, different or revised interpretation result) by comparing a realtime interpretation result and a non-realtime interpretation result. In the example illustrated in FIG. 3, realtime interpretation is performed by dividing a source voice signal "시청 근처 지하철 역으로 가려면 어떻게 해야 하나요?" input from a user A into a first partial source voice signal "시청 근처 지하철 역으로" and a second partial source voice signal "가려면 어떻게 해야 하나요?".

A first target sentence 310 corresponding to a first target voice signal, which is a realtime interpretation result, includes partial target sentences corresponding to partial target voice signals, which are, in combination, the first target voice signal, the realtime interpretation result obtained by dividing the source voice signal into at least one word and performing realtime interpretation. The first target sentence 310 is determined to be a combination of a first partial target sentence 311 "Subway Station near City Hall" corresponding to a first partial target voice signal and a second partial target sentence 312 "How do I go?" corresponding to a second partial target voice signal, which are a realtime interpretation result obtained by dividing the source voice signal into the at least one word and performing the realtime interpretation. The first target sentence 310 is thus "Subway Station near City Hall How do I go?"

A second target sentence 320 corresponding to a second target voice signal, which is a non-realtime interpretation result, includes a sentence corresponding to the second target voice signal, which is the non-realtime interpretation result obtained by performing non-realtime interpretation on the source voice signal by each sentence as a unit. The second target sentence 320 is "How do I go to the Subway Station near City Hall?"

In one example, the automated interpretation apparatus determines whether to re-output an interpretation result based on a difference between the first target sentence 310 corresponding to the first target voice signal and the second target sentence 320 corresponding to the second target voice signal. In general, the non-realtime interpretation result obtained by performing the non-realtime interpretation on the source voice signal by each sentence as a unit is of a higher interpretation quality compared to the realtime interpretation result obtained by performing the realtime interpretation by dividing the source voice signal into the at least one word. Thus, in a case that the realtime interpretation result and the non-realtime interpretation result are the same or similar to each other and the difference between the first target sentence 310 and the second target sentence 320 is thus not greater than a preset reference value, a quality of the realtime interpretation result may be sufficiently high and the automated interpretation apparatus determines that the interpretation result is not to be re-output. Conversely, in a case that the realtime interpretation result and the non-realtime interpretation result are not the same or similar to each other, and the difference between the first target sentence 310 and the second target sentence 320 is thus greater than the reference value, the quality of the realtime interpretation result may be relatively low and the automated interpretation apparatus determines that the interpretation result is to be re-output. For example, the difference between the first target sentence 310 and the second target sentence 320 is determined by measuring a similarity between the sentences.

In addition, in a case in which the first target sentence 310 does not have a same meaning as the second target sentence 320, the automated interpretation apparatus determines that the interpretation result is to be re-output. By determining whether the first target sentence 310 has the same meaning as the second target sentence 320, the automated interpretation apparatus determines the difference between the first target sentence 310 and the second target sentence 320. For example, in a case in which the first target sentence 310 has the same meaning as the second target sentence 320, the automated interpretation apparatus determines that the difference between the first target sentence 310 and the second target sentence 320 is less than or equal to the reference value and determines that the interpretation result is not to be re-output. Conversely, in a case in which the first target sentence 310 does not have the same meaning as the second target sentence 320, the automated interpretation apparatus determines that the difference between the first target sentence 310 and the second target sentence 320 exceeds the reference value and determines that the interpretation result is to be re-output.

In the example illustrated in FIG. 3, the first target sentence 310 "Subway Station near City Hall How do I go?" does not have the same meaning as the second target sentence 320 "How do I go to the Subway Station near City Hall?," and the automated interpretation apparatus determines that the interpretation result is to be re-output.

In an example, in a case in which a degradation of an interpretation quality of the first target sentence 310 determined based on a comparison between the first target sentence 310 and the second target sentence 320 exceeds a preset reference value, the automated interpretation apparatus determines that the interpretation result is to be re-output. The degradation of the interpretation quality of the first target sentence 310 indicates a degree to which the interpretation quality of the first target sentence 310 is degraded based on an interpretation quality of the second target sentence 320. The automated interpretation apparatus determines the degradation of the interpretation quality of the first target sentence 310 based on a degree of matching between the first target sentence 310 and the second target sentence 320.

That is, in the case in which the degradation of the interpretation quality of the first target sentence 310 exceeds the reference value, the automated interpretation apparatus determines that the interpretation result is to be re-output. Conversely, in a case in which the degradation of the interpretation quality of the first target sentence 310 is less than or equal to the reference value, the automated interpretation apparatus determines that the interpretation result is not to be re-output.

Referring to FIG. 4, the automated interpretation apparatus determines whether to re-output an interpretation result based on whether a first target sentence 400 corresponding to a first target voice signal is suited to a grammar rule of a second language. In the example illustrated in FIG. 4, the automated interpretation apparatus performs realtime interpretation on a source voice signal "나는 점심으로 스시를 먹었다" input from a user A by dividing the source voice signal into each sentence element and interpreting partial source voice signals "나는," "점 심으로 ," " 초밥을 ," and "먹었다 ."

In one example, in a case in which the first target sentence 400 is not suited to the grammar rule of the second language, the automated interpretation apparatus determines that an interpretation result is to be re-output. For example, in a case in which the first target sentence 400 is not suited to a word order of the second language, the automated interpretation apparatus determines that the interpretation result is to be re-output. Conversely, in a case in which the first target sentence 400 is suited to the word order of the second language, the automated interpretation apparatus determines that the interpretation result is not to be re-output.

In the example illustrated in FIG. 4, the first target sentence 400 is "I for lunch sushi ate." Generally, in English, a predicate is positioned subsequent to a subject, and an object is positioned subsequent to the predicate. However, in the first target sentence 400, a subject 410 "I" is followed by a modifier 420 "for lunch," and an object 430 "sushi" is followed by a predicate 440 "ate." That is, the first target sentence 400 is not suited to an English grammar rule, for example, a word order of English, and thus the automated interpretation apparatus determines that the interpretation result is to be re-output.

Figure 5:
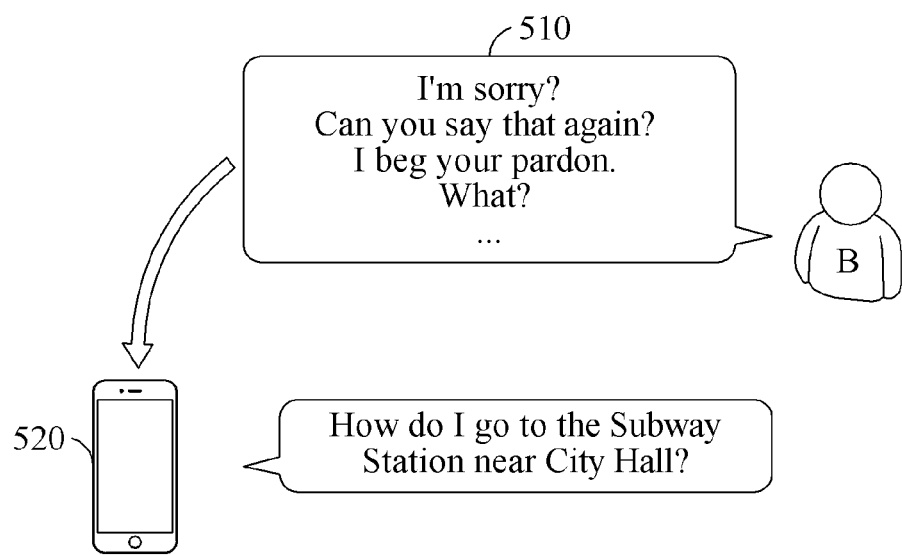
FIGS. 5 and 6 are diagrams illustrating another example of a method of determining whether to re-output an interpretation result.
Figure 6:
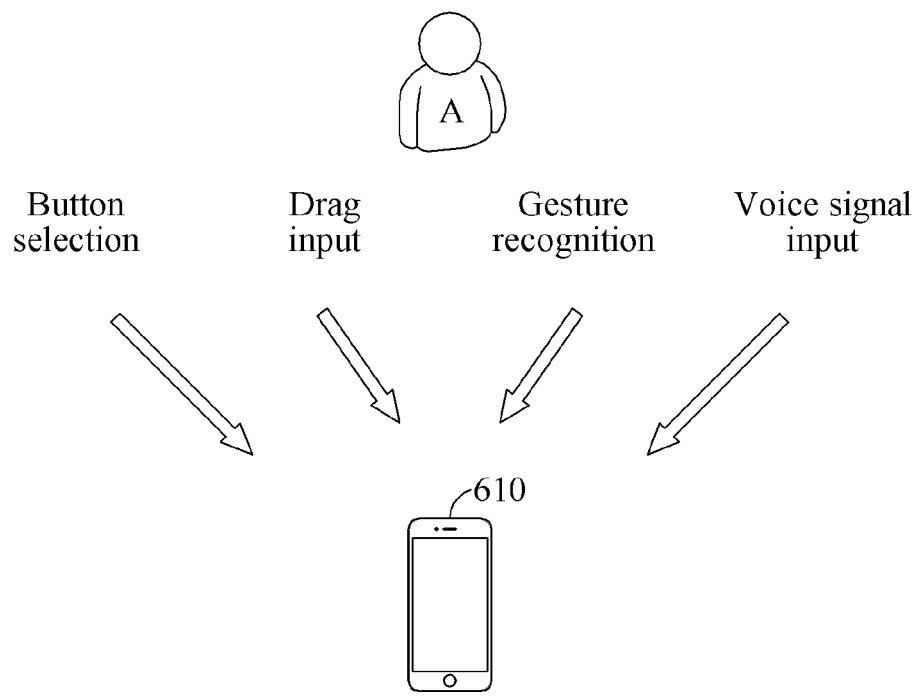

FIGS. 5 and 6 are diagrams illustrating another example of a method of determining whether to re-output an interpretation result. In the example of FIGS. 5 and 6, an automated interpretation apparatus determines whether to re-output an interpretation result based on feedback on a first target voice signal, which is a realtime interpretation result, from a user. The feedback from a user may include a voice signal input by the user and a command for requesting the re-outputting of the interpretation result. The user may be a user speaking the first target voice signal, for example, a user A, or a counterpart user listening to the first target voice signal, for example, a user B.

Referring to FIG. 5, an automated interpretation apparatus 520 determines whether to re-output an interpretation result based on feedback input by a user B, for example, a voice signal 510.

In a case in which an interpretation quality of a first target voice signal, which is a realtime interpretation result, is not sufficiently high, the user B may not continue a significant conversation with the user A using only the first target voice signal output from the automated interpretation apparatus 520. In such a case, the user B may speak a voice signal requesting the user A to speak again and/or a voice signal indicating that the user B does not understand what the user A has spoken, for example, the voice signal 510. As illustrated in FIG. 5, the voice signal 510 includes the voice signal requesting the user A to speak again, for example, "I'm sorry?," "Can you say that again?," "I beg your pardon," and "What?," and/or the voice signal indicating that the user B does not understand what the user A has spoken, for example, "I don't understand what you said."

Thus, the automated interpretation apparatus 520 determines whether to re-output the interpretation result based on the voice signal 510 input by the user B after the first target voice signal is output. For example, the automated interpretation apparatus 520 determines whether the voice signal 510 of the user B corresponds to negative feedback, and determines that the interpretation result is to be re-output in response to the voice signal 510 corresponding to the negative feedback.

For example, in a case in which the voice signal requesting the user A to speak again and/or the voice signal indicating that the user B does not understand what the user A has spoken is input, the automated interpretation apparatus 520 determines the voice signal 510 input by the user B to correspond to the negative feedback, and determines that the interpretation result is to be re-output. Conversely, in a case in which a voice signal corresponding to a general conversation is input by the user B, instead of the voice signal requesting the user A to speak again and/or the voice signal indicating that the user B does not understand what the user A has spoken, the automated interpretation apparatus 520 determines that the voice signal does not correspond to the negative feedback and determines that the interpretation result is not to be re-output.

Referring to FIG. 6, an automated interpretation apparatus 610 determines whether to re-output an interpretation result based on feedback input by a user A, for example, a command for requesting re-outputting of the interpretation result.

The automated interpretation apparatus 610 determines whether to re-output the interpretation result based on the feedback input by the user A. For example, the user A realizes that a user B listening to a first target voice signal does not fully understand what the user A has spoken using only the first target voice signal (e.g., a realtime interpretation result, without a second or subsequent target voice signal, which is a non-realtime interpretation result), based on an expression or a gesture provided or performed by the user B. In another example, the user A realizes by himself or herself that an interpretation quality of the first target voice signal output from the automated interpretation apparatus 610 is not sufficiently high. In such examples, the user A controls the automated interpretation apparatus 610 to output a non-realtime interpretation result by inputting a command for requesting the re-outputting of the interpretation result.

That is, the automated interpretation apparatus 610 determines whether to re-output the interpretation result based on whether the command for requesting the re-outputting of the interpretation result is input by the user A. The command for requesting the re-outputting of the interpretation result may correspond to negative feedback.

For example, the command for requesting the re-outputting of the interpretation result is input to the automated interpretation apparatus 610 when the command is displayed on a touch screen of the automated interpretation apparatus 610, a button included in the automated interpretation apparatus 610 is selected, a preset drag is input through the touch screen of the automated interpretation apparatus 610, a preset gesture is recognized through a sensor of the automated interpretation apparatus 610, or a voice signal of the user A is received through a microphone of the automated interpretation apparatus 610. In addition to the examples described in the foregoing, the command for requesting the re-outputting of the interpretation result may be input to the automated interpretation apparatus 610 through various methods.

In the case in which the command for requesting the re-outputting of the interpretation result is input by the user A, the automated interpretation apparatus 610 determines that the interpretation result is to be re-output. Conversely, in a case in which the command for requesting the re-outputting of the interpretation result is not input by the user A, the automated interpretation apparatus 610 determines that the interpretation result is not to be re-output.

In one example, the automated interpretation apparatus 610 determines whether to re-output an interpretation result based collectively on the realtime interpretation result described with reference to FIGS. 3 and 4, and the feedback from a user described with reference to FIGS. 5 and 6. For example, in a case in which negative feedback is input by a user despite a determination that the interpretation result is not to be re-output based on a realtime interpretation quality, the automated interpretation apparatus 610 finally determines that the interpretation result is to be re-output and outputs a second target voice signal. In another example, in a case in which the automated interpretation apparatus 610 determines that the interpretation result is to be re-output based on the realtime interpretation quality although the negative feedback is not input by the user, the automated interpretation apparatus 610 finally determines that the interpretation result is to be re-output and outputs the second target voice signal.

That is, in a case in which one of a result of the determination based on the realtime interpretation quality and a result of the determination based on the feedback from a user is the determination that the interpretation result is to be re-output, the automated interpretation apparatus 610 may finally determine that the interpretation result is to be re-output.

Figure 7:
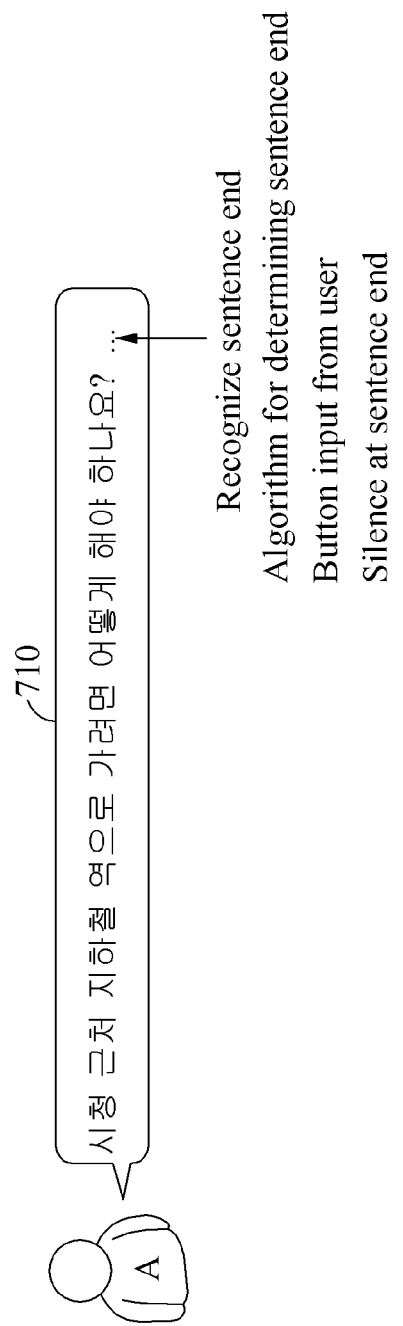
FIG. 7 is a diagram illustrating an example of a method of recognizing a sentence end from a source voice signal.

FIG. 7 is a diagram illustrating an example of a method of recognizing a sentence end from a source voice signal. Referring to FIG. 7, an automated interpretation apparatus recognizes a sentence end from a source voice signal 710, and interprets the source voice signal 710 by each sentence as a unit.

The automated interpretation apparatus recognizes the sentence end from the source voice signal 710 to perform non-realtime interpretation. For example, the automated interpretation apparatus recognizes the sentence end using a known algorithm for determining a sentence end, or based on a button selected by a user or a silence included in the sentence end.

For example, the automated interpretation apparatus determines a start and an end of a sentence based on a button selected before a user A speaks and a button selected after the user A speaks. Alternatively, in a case in which a button is pressed only while the user A is speaking, the automated interpretation apparatus determines the sentence in the source voice signal 710 to be input during the button being selected by the user A (e.g., the sentence is determined to start when the button is pressed and end when the button is released).

In addition, the automated interpretation apparatus may detect a silence having a time length equal to or greater than a reference time length from the source voice signal 710, and may determine the sentence end included in the source voice signal 710 based on the detected silence. A reference time length for determining a silence included in an end of a sentence may be longer than a reference time length for determining a silence included in a middle of the sentence.

Figure 8:
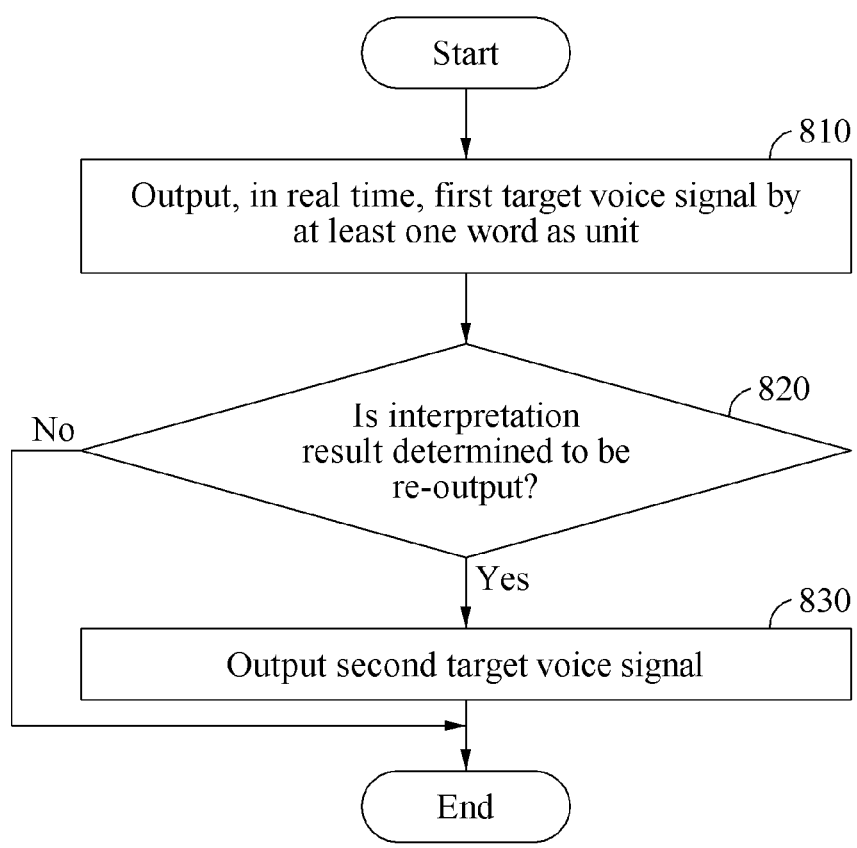
FIG. 8 is a flowchart illustrating an example of an automated interpretation method.

FIG. 8 is a flowchart illustrating an example of an automated interpretation method. Referring to FIG. 8, the automated interpretation method may be performed by a processor included in an automated interpretation apparatus.

In operation 810, the automated interpretation apparatus interprets a source voice signal expressed in a first language by dividing the source voice signal into at least one word as a unit while the source voice signal is being input, and outputs, as an interpretation result in real time, a first target voice signal expressed in a second language by each unit.

The at least one word is determined based on a silence included in a middle of the source voice signal, or a sentence element included in the source voice signal.

In operation 820, the automated interpretation apparatus determines whether to re-output the interpretation result. The automated interpretation apparatus determines whether to re-output the interpretation result based on a difference between a first target sentence corresponding to a first target voice signal and a second target sentence corresponding to a second target voice signal. For example, the automated interpretation apparatus determines that the interpretation result is to be re-output in a case in which the difference between the first target sentence and the second target sentence is greater than a reference value. In addition, in a case in which the first target sentence corresponding to the first target voice signal is not suited to a grammar rule of the second language, the automated interpretation apparatus determines that the interpretation result is to be re-output.

The automated interpretation apparatus also determines whether to re-output the interpretation result based on feedback on the first target voice signal from a user.

In operation 830, in response to a determination that the interpretation result is to be re-output, the automated interpretation apparatus interprets the source voice signal by each sentence as a unit, and outputs the second target voice signal expressed in the second language as the interpretation result.

The automated interpretation apparatus outputs the second target voice signal after outputting a message indicating that the interpretation result is to be re-output, and thus minimizes confusion that may be experienced by a user B due to the re-outputting of the interpretation result.

In addition, the automated interpretation apparatus performs non-realtime interpretation on the source voice signal after determining that the interpretation result is to be re-output, and thus effectively uses a system resource of the automated interpretation apparatus to perform interpretation.

The descriptions provided with reference to FIGS. 1 through 7 are applicable to the operations described with reference to FIG. 8, and thus a more detailed and repeated description is omitted here for brevity.

Figure 9:
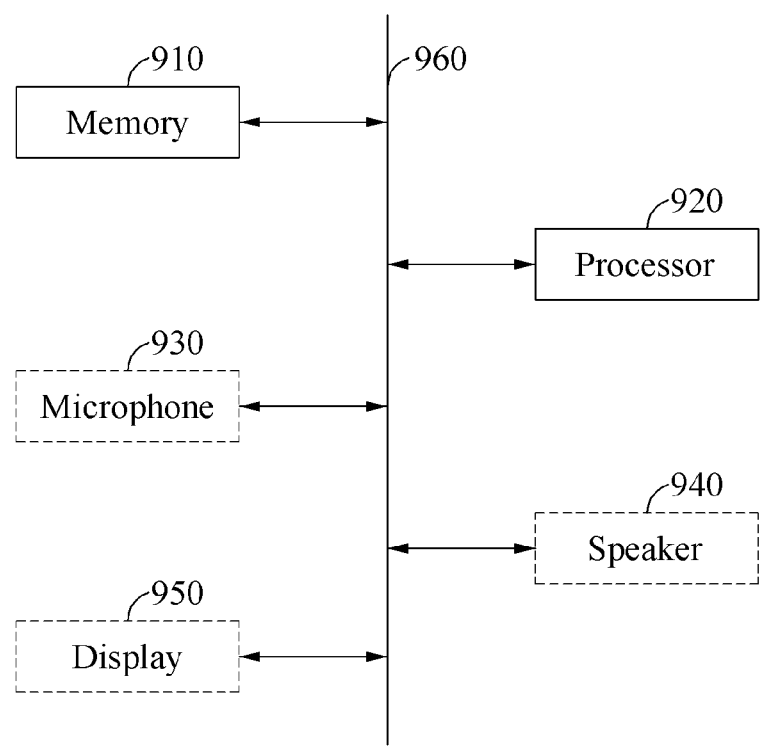
FIG. 9 is a diagram illustrating an example of an automated interpretation apparatus.

FIG. 9 is a diagram illustrating an example of an automated interpretation apparatus 900. Referring to FIG. 9, the automated interpretation apparatus 900 includes a memory 910 and a processor 920. The automated interpretation apparatus 900 may further include a microphone 930, a speaker 940, and a display 950. Alternatively, the microphone 930, the speaker 940, and the display 950 may be provided in one or more separate apparatuses in communication with the automated interpretation apparatus 900. The memory 910, the processor 920, the microphone 930, the speaker 940, and the display 950 exchange data with one another through a bus 960.

The memory 910 may include a volatile memory and a nonvolatile memory, and stores information received through the bus 960. The memory 910 includes at least one instruction that is executable by the processor 920. In addition, the memory 910 stores a source voice signal input from a user A, and transfers the stored source voice signal to the processor 920 for interpretation.

The processor 920 executes the at least one instruction stored in the memory 910. The processor 920 interprets the source voice signal expressed in a first language by dividing the source voice signal into at least one word as a unit while the source voice signal is being input, and outputs, as an interpretation result in real time, a first target voice signal expressed in a second language by each unit. The processor 920 then determines whether to re-output the interpretation result. In response to a determination that the interpretation result is to be re-output, the processor 920 interprets the source voice signal by each sentence as a unit, and outputs a second target voice signal expressed in the second language as the interpretation result.

The microphone 930 receives a voice signal from the user A or a user B. The voice signal input by the user A through the microphone 930 is a target for interpretation, which is the source voice signal. In addition, the voice signal input by the user B through the microphone 930 is user feedback to be referred to in order to determine whether to re-output the interpretation result.

The speaker 940 outputs the first target voice signal as a realtime interpretation result or the second target voice signal as a non-realtime interpretation result. In addition, before outputting the second target voice signal, the speaker 940 may output, as a voice signal, a message indicating that the interpretation result is to be re-output.

The display 950 outputs a sentence expressed in the second language as the interpretation result. For example, the display 950 displays a first target sentence corresponding to the first target voice signal, which is the realtime interpretation result, or a second target sentence corresponding to the second target voice signal, which is the non-realtime interpretation result.

The descriptions provided with reference to FIGS. 1 through 8 are applicable to the components illustrated in FIG. 9, and thus a more detailed and repeated description is omitted here for brevity.

Figure 10:
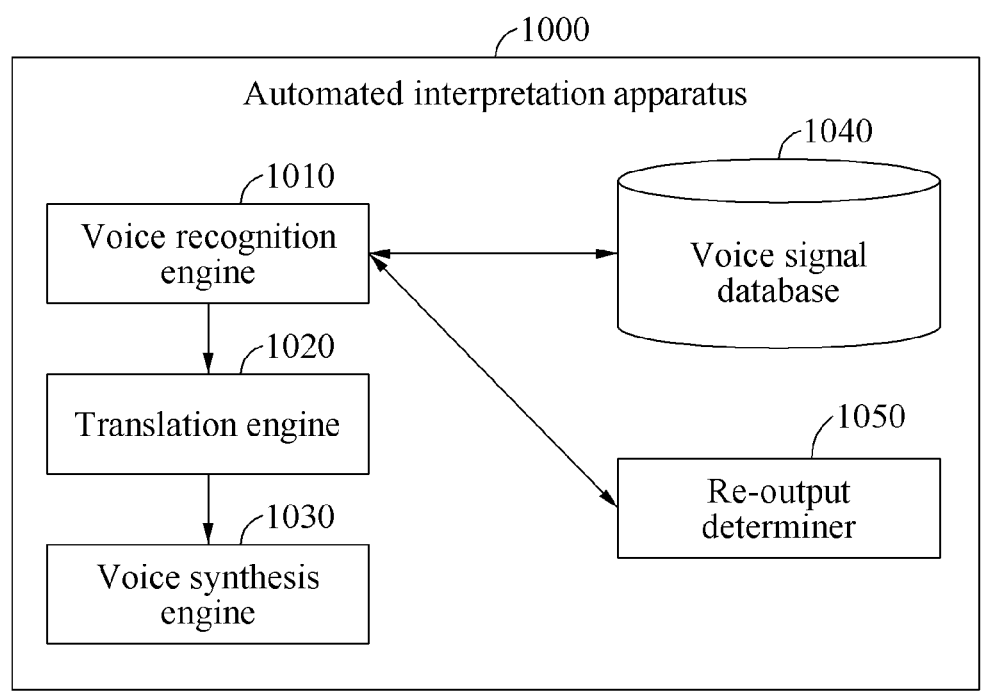
FIG. 10 is a diagram illustrating another example of an automated interpretation apparatus.

FIG. 10 is a diagram illustrating another example of an automated interpretation apparatus 1000. Referring to FIG. 10, the automated interpretation apparatus 1000 includes a voice recognition engine 1010, a translation engine 1020, a voice synthesis engine 1030, a voice signal database 1040, and a re-output determiner 1050.

The voice recognition engine 1010 converts a source voice signal expressed in a first language to a source sentence expressed in the first language. The translation engine 1020 converts the source sentence expressed in the first language to a target sentence expressed in a second language. The voice synthesis engine 1030 converts the target sentence expressed in the second language to a target voice signal expressed in the second language. As necessary, the automated interpretation apparatus 1000 outputs the target sentence obtained through the converting from the translation engine 1020 without performing the operation of the voice synthesis engine 1030.

The voice signal database 1040 stores the source voice signal input from a user A. For example, the voice signal database 1040 stores the source voice signal input from the user A so that non-realtime interpretation can be performed even after a realtime interpretation result is output.

The re-output determiner 1050 determines whether to re-output the interpretation result after outputting the first target voice signal, which is the realtime interpretation result.

The descriptions provided with reference to FIGS. 1 through 9 are applicable to the components illustrated in FIG. 10, and thus a more detailed and repeated description is omitted here for brevity.

Figure 11:
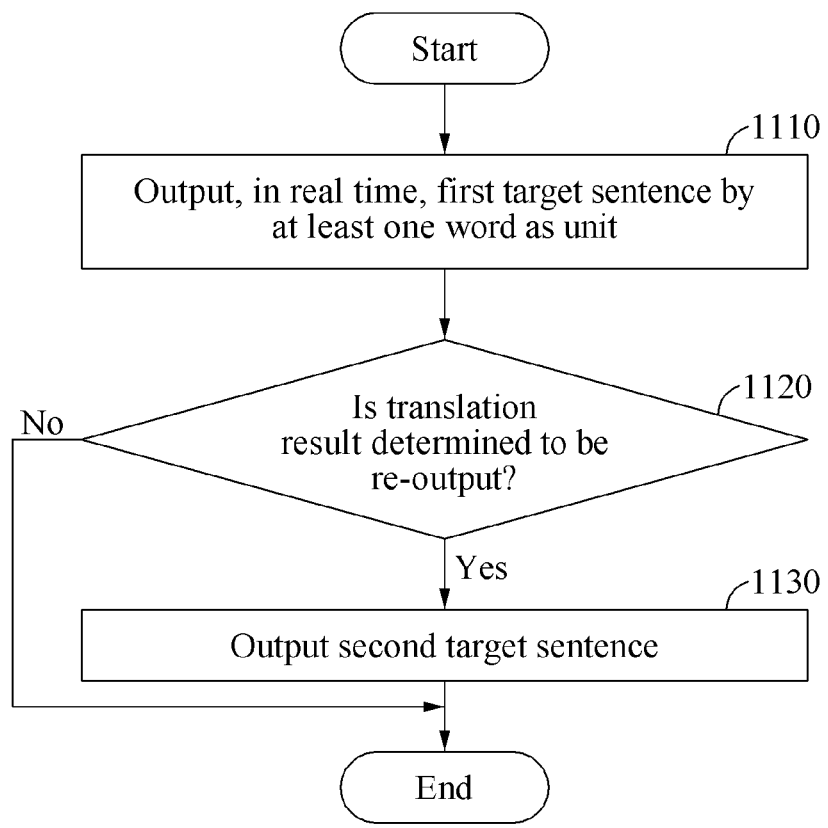
FIG. 11 is a flowchart illustrating an example of a machine translation method.

FIG. 11 is a flowchart illustrating an example of a machine translation method.

Referring to FIG. 11, the machine translation method may be performed by a processor included in a machine translation apparatus.

In operation 1110, the machine translation apparatus translates a source sentence expressed in a first language by dividing the source sentence into at least one word as a unit while the source sentence is being input, and outputs, as a translation result in real time, a first target sentence expressed in a second language by each unit. The first target sentence therefore indicates a realtime translation result.

The at least one word is determined based on a spacing included in a middle of the source sentence or a pause during the inputting of the source sentence, or a sentence element included in the source sentence.

In operation 1120, the machine translation apparatus determines whether to re-output the translation result based on a difference between the first target sentence, which is the realtime translation result, and a second target sentence, which is a non-realtime translation result. The second target sentence indicates the non-realtime translation result obtained by translating the source sentence by each sentence as a unit. In addition, in response to the first target sentence, which is the realtime translation result, not being suited to a grammar rule of the second language, the machine translation apparatus determines that the translation result is to be re-output.

For example, the machine translation apparatus determines whether to re-output the translation result based on user feedback on the first target sentence.

In operation 1130, in response to a determination that the translation result is to be re-output, the machine translation apparatus translates the source sentence by each sentence as a unit and outputs the second target sentence expressed in the second language as the translation result.

By outputting the second target sentence after outputting a message indicating that the translation result is to be re-output, the machine translation apparatus minimizes confusion that may be experienced by a user B due to the re-outputting of the translation result.

In addition, by performing non-realtime translation on the source sentence after determining that the translation result is to be re-output, the machine translation apparatus effectively uses a system resource of the machine translation apparatus to perform translation.

The descriptions of operations of an automated interpretation apparatus described above, excluding an operation of a voice synthesizer, are applicable to the operations described with reference to FIG. 11, and thus a more detailed and repeated description is omitted here for brevity.

According to example embodiments described herein, a non-realtime interpretation result is selectively output after a realtime interpretation result is output, and thus a high interpretation quality is maintained and an interpretation speed is also effectively improved.

According to example embodiments described herein, in a case in which a quality of a realtime interpretation result is not satisfactory, non-realtime interpretation is performed on a stored source voice signal, and thus a high-quality interpretation result is provided without a need for a user to speak again.

According to example embodiments described herein, by performing non-realtime interpretation after determining that an interpretation result is to be re-output, a system resource needed for performing interpretation is effectively used.

According to example embodiments described herein, by outputting a message indicating that an interpretation result is to be re-output before outputting a non-realtime interpretation result, confusion that may be experienced by a user due to the re-outputting of the interpretation result is minimized.

The memory 910, the processor 920, and the display 950 in FIG. 9, and the voice recognition engine 1010, the translation engine 1020, the voice synthesis engine 1030, the voice signal database 1040, and the re-output determiner 1050 in FIG. 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 2A, 2B, 3-8 and 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An automated interpretation method, comprising:
    performing a machine interpretation of a source voice signal expressed in a first language, by dividing the source voice signal into at least one word as a unit while the source voice signal is being input, to thereby generate for each unit respective portions of a first target sentence expressed in a second language, and outputting in real time, by unit, a first target voice signal corresponding to the respective portions of the first target sentence; and
    performing another machine interpretation of the source voice signal, by a sentence as a unit, to thereby generate a second target sentence expressed in the second language, and selectively outputting a second target voice signal corresponding to the second target sentence,
    wherein the selective outputting of the second target voice signal is based on a determination, dependent on the first target sentence, of whether to re-output an interpretation of the source voice signal, and
    wherein the dividing of the source voice signal into the at least one word is performed to divide the source voice signal into one or more respective words, each according to a single-word unit, and/or to divide the source voice signal into one or more respective phrases, each according to a greater-than-word unit, where the single-word unit and the greater-than-word unit are respective units that are shorter than the sentence as the unit in the performing of the other machine interpretation of the source voice signal.

2. The method of claim 1,
    wherein the determining of whether to re-output the interpretation comprises determining whether to re-output the interpretation based on a difference between the first target sentence and the second target sentence.

3. The method of claim 2, wherein the determining of whether to re-output the interpretation further comprises determining that the interpretation is to be re-output, in response to the first target sentence being determined to not have a same meaning as the second target sentence.

4. The method of claim 2, wherein the determining of whether to re-output the interpretation further comprises determining that the interpretation is to be re-output, in response to a degradation of an interpretation quality of the first target sentence determined based on the second target sentence being greater than or equal to a reference value.

5. An automated interpretation method, comprising:
    performing a machine interpretation of a source voice signal expressed in a first language, by dividing the source voice signal into at least one word as a unit while the source voice signal is being input, to thereby generate for each unit respective portions of a first target sentence expressed in a second language, and outputting in real time, by unit, a first target voice signal corresponding to the respective portions of the first target sentence; and
    performing another machine interpretation of the source voice signal, by a sentence as a unit, to thereby generate a second target sentence expressed in the second language, and selectively outputting a second target voice signal corresponding to the second target sentence,
    wherein the selective outputting of the second target voice signal is based on a determination of whether to re-output an interpretation of the source voice signal, wherein the determining of whether to re-output the interpretation comprises determining that the interpretation is to be re-output, in response to the first target sentence being determined to not be suited to a grammar rule of the second language, and
    wherein the dividing of the source voice signal into the at least one word is performed to divide the source voice signal into one or more respective words, each according to a single-word unit, and/or to divide the source voice signal into one or more respective phrases, each according to a greater-than-word unit, where the single-word unit and the greater-than-word unit are respective units that are shorter than the sentence as the unit in the performing of the other machine interpretation of the source voice signal.

6. The method of claim 5, wherein the determining of whether to re-output the interpretation further comprises determining that the interpretation is to be re-output, in response to the first target sentence being determined to not be suited to a word order of the second language.

7. The method of claim 1, wherein the determining of whether to re-output the interpretation comprises determining whether to re-output the interpretation based on feedback on the first target voice signal from a user.

8. The method of claim 7, wherein the determining of whether to re-output the interpretation further comprises determining whether to re-output the interpretation based on a voice signal input from a user listening to the first target voice signal.

9. The method of claim 7, wherein the determining of whether to re-output the interpretation comprises determining whether to re-output the interpretation based on whether a command for requesting the re-outputting of the interpretation is input, subsequent to the first target voice signal being output, by a user that expressed the source voice signal.

10. The method of claim 1, wherein the at least one word is determined based on one of a silence included in the source voice signal and a sentence element included in the source voice signal.

11. The method of claim 1, wherein the outputting of the second target voice signal, in the selective outputting of the second target voice signal, comprises outputting the second target voice signal subsequent to outputting a message indicating that the interpretation is to be re-output.

12. The method of claim 1, wherein the outputting of the second target voice signal, in the selective outputting of the second target voice signal, comprises the performing of the other machine interpretation of the source voice signal and the outputting of the second target voice signal, subsequent to the determination of whether to re-output the interpretation.

13. A non-transitory computer-readable storage medium storing instructions that, when executed by a processor, cause the processor to perform the method of claim 1.

14. An automated machine translation method, comprising:
performing a machine translation of a source sentence expressed in a first language, by dividing the source sentence into at least one word as a unit while the source sentence is being input, to thereby generate for each unit respective portions of a first target sentence expressed in a second language, and outputting in real time, by unit, the respective portions of the first target sentence;
performing another machine translation of the source sentence, by a sentence as a unit, to thereby generate a second target sentence expressed in the second language, and selectively outputting a second target voice signal corresponding to the second target sentence,
wherein the selective outputting of the second target voice signal is based on a determination, dependent on the first target sentence, of whether to re-output a translation of the source sentence, and
wherein the dividing of the source sentence into the at least one word is performed to divide the source voice signal into one or more respective words, each according to a single-word unit, and/or to divide the source voice signal into one or more respective phrases, each according to a greater-than-word unit, where the single-word unit and the greater-than-word unit are respective units that are shorter than the sentence as the unit in the performing of the other machine interpretation of the source voice sentence.

15. An automated interpretation apparatus comprising:
a memory storing at least one instruction; and
a processor configured to, by executing the at least one instruction,
perform a machine interpretation of a source voice signal expressed in a first language, by dividing the source voice signal into at least one word as a unit while the source voice signal is being input, to thereby generate for each unit respective portions of a first target sentence expressed in a second language, and output in real time, by unit, a first target voice signal corresponding to the respective portions of the first target sentence,
perform another machine interpretation of the source voice signal, by a sentence as a unit, to thereby generate a second target sentence expressed in the second language, and selectively output a second target voice signal corresponding to the second target sentence,
wherein the selective output of the second target voice signal is based on a determination, dependent on the first target sentence, of whether to re-output an interpretation of the source voice signal, and
wherein the dividing of the source voice signal into the at least one word is performed to divide the source voice signal into one or more respective words, each according to a single-word unit, and/or to divide the source voice signal into one or more respective phrases, each according to a greater-than-word unit, where the single-word unit and the greater-than-word unit are respective units that are shorter than the sentence as the unit in the performing of the other machine interpretation of the source voice signal.

16. The automated interpretation apparatus of claim 15, wherein the processor is configured to determine whether to re-output the interpretation based on a difference between the first target sentence and the second target sentence.

17. The automated interpretation apparatus of claim 16, wherein the processor is configured to determine that the interpretation is to be re-output, in response to the first target sentence being determined to not have a same meaning as the second target sentence.

18. The automated interpretation apparatus of claim 16, wherein the processor is configured to determine that the interpretation is to be re-output, in response to a degradation of an interpretation quality of the first target sentence determined based on the second target sentence being greater than or equal to a preset reference value.

19. The automated interpretation apparatus of claim 15, wherein the processor is configured to determine that the interpretation is to be re-output, in response to the first target sentence being determined to not be suited to a grammar rule of the second language.

20. The automated interpretation apparatus of claim 15, wherein the processor is configured to determine whether to re-output the interpretation based on feedback on the first target voice signal from a user.

21. An automated interpretation method, comprising:
performing a machine interpreting of a source voice signal expressed in a first language, by machine interpreting sentence elements in the source voice signal as the sentence elements are spoken, to thereby generate for each sentence element respective portions of a first target sentence expressed in a second language;
outputting, as the sentence elements are interpreted, a first target voice signal corresponding to the respective portions of the first target sentence;
performing another machine interpreting of the source voice signal, by analyzing a complete sentence of the source voice signal as a unit, to thereby generate a second target sentence expressed in the second language; and
determining whether, based on any one of a difference between the first target sentence and the second target sentence, and feedback from a user, to output another interpretation of the source voice signal; and
selectively outputting a second target voice signal, corresponding to the second target sentence, based on a result of the determining,
wherein the respective portions of the first target sentence are single word units or greater-than-word units that are respective units shorter than a sentence unit represented by the analyzed complete sentence of the source voice signal performed in the other machine interpreting of the source voice signal.

22. The method of claim 21, further comprising outputting an indication that the other interpretation is to be output, prior to an output of the second target voice signal in the selective outputting of the second target voice signal.

23. The method of claim 21, wherein each of the sentence elements comprises any one of a subject, a predicate corresponding to a verb, an object, a complement, and a modifier corresponding to an adverb.

24. The method of claim 21, further comprising:
storing the sentence elements in a memory,
wherein the analyzing of the complete sentence of the source voice signal as the unit comprises obtaining the sentence elements from the memory.

25. An automated interpretation method, comprising:
performing a first machine interpretation of a source voice signal in a first language by performing:
a first word unit or first plural word unit, less than a sentence unit, based translation of a first portion of the source voice signal to generate a first target sentence portion in a second language;
a second word unit or second plural word unit, less than the sentence unit, based translation of a second portion of the source voice signal, distinct from the first portion of the source voice signal, to generate a second target sentence portion in the second language;
combining at least the first target sentence portion and the second target sentence portion to generate a first target sentence, as an output first translated sentence result of the source voice signal; and
selectively, dependent on the generated first target sentence, performing a second machine interpretation of the source voice signal by performing a sentence unit based translation of the source voice signal to generate a second target sentence in the second language, as a second translated sentence result of the source voice signal.

26. The method of claim 25, wherein the selective performing of the second machine interpretation includes a consideration of whether a command by a speaker of the source voice signal has been received, after the generation of the first target sentence, requesting a greater accuracy of translation of the source voice signal.

27. The method of claim 25, the selective performing of the second machine interpretation includes consideration of whether an interpretation quality of the first target sentence is degraded compared to an interpretation quality of the second target sentence, and outputting the second target sentence when the first target sentence is determined to be degraded.

28. The method of claim 27, wherein the consideration of whether the interpretation quality of the first target sentence is degraded includes performing a matching between the first target sentence and the second target sentence, and basing a determination of whether the interpretation quality of the first target sentence is degraded dependent on a result of the matching.

29. The method of claim 28, wherein, regardless of whether the first target sentence is determined to be degraded, the selective performing of the second machine interpretation is dependent on consideration of whether a command by a speaker of the source voice signal has been received, after the generation of the first target sentence, requesting a greater accuracy of translation of the source voice signal, where the receipt of the command results in the second machine interpretation of the source voice signal being selected to be performed and the second target sentence output.

30. An automated interpretation method, comprising:
performing a first word unit or first plural word unit, less than a sentence unit, based translation of a source voice signal in a first language to generate a target sentence in a second language, as a first translated sentence result of the source voice signal;
outputting an interpretation of the source voice signal by outputting the first translated sentence result;
performing a sentence unit based translation of the source voice signal to generate a second target sentence in the second language, as a second translated sentence result of the source voice signal; and
selectively, based on an automated comparison of the outputted interpretation of the source voice signal and the second translated sentence result of the source voice signal, re-outputting the interpretation of the source voice signal by outputting the second translated sentence result.

31. The method of claim 30, wherein the comparison includes a comparison of a meaning of the outputted interpretation of the source voice signal and a meaning of the second target sentence, and the re-outputting of the interpretation of the source voice signal is selected to be performed when the meaning of the outputted interpretation of the source voice signal and the meaning of the second target sentence are determined to not match.

32. The method of claim 30, wherein the source voice signal is in text form.

33. The method of claim 32, further comprising performing a speech recognition of a captured speech to generate the source voice signal in the text form.

34. The method of claim 30, wherein the outputting of the interpretation of the source voice signal, and the selective re-outputting of the interpretation of the source voice signal, respectively include audibly outputting corresponding speech.

35. The method of claim 30, wherein the comparison includes a determination of whether an interpretation quality of the outputted interpretation of the source voice signal is degraded compared to an interpretation quality of the second target sentence, and the re-outputting of the interpretation of the source voice signal is selected to be performed when the outputted interpretation of the source voice signal is determined to be degraded.

36. The method of claim 35, wherein the determination of whether the interpretation quality of the outputted interpretation of the source voice signal is degraded includes performing a matching between the outputted interpretation of the source voice signal and the second target sentence, and basing the determination of whether the interpretation quality of the outputted interpretation of the source voice signal is degraded dependent on a result of the matching.

* * * * *